United States Patent
Nakamura et al.

(10) Patent No.: US 9,416,686 B2
(45) Date of Patent: Aug. 16, 2016

(54) HEAT RECOVERY STEAM GENERATOR AND POWER PLANT

(71) Applicant: KABUSHIKI KAISHA TOSHIBA, Minato-ku (JP)

(72) Inventors: Keiichi Nakamura, Yokohama (JP); Hideaki Shimada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 378 days.

(21) Appl. No.: 14/090,813

(22) Filed: Nov. 26, 2013

(65) Prior Publication Data
US 2014/0090356 A1  Apr. 3, 2014

Related U.S. Application Data

(63) Continuation of application No. PCT/JP2012/064233, filed on May 31, 2012.

(30) Foreign Application Priority Data

May 31, 2011 (JP) ................................ 2011-122420

(51) Int. Cl.
*F01K 23/10* (2006.01)
*F23N 5/00* (2006.01)
*F23C 5/08* (2006.01)

(52) U.S. Cl.
CPC ............. *F01K 23/101* (2013.01); *F01K 23/103* (2013.01); *F01K 23/105* (2013.01);
(Continued)

(58) Field of Classification Search
CPC ..... F01K 23/10; F01K 23/101; F01K 23/103; F01K 23/105; F01K 23/106; Y02E 20/14; Y02E 20/16

USPC .............................. 60/39.182, 39.5; 122/7 R
See application file for complete search history.

(56) References Cited

U.S. PATENT DOCUMENTS 3,443,550 A * 5/1969 Kovacik ................ F22B 1/1861
                                                      122/7 R
4,555,902 A * 12/1985 Pilarczyk ................ F01K 27/02
                                                      60/39.5

(Continued)

FOREIGN PATENT DOCUMENTS

GB          2277965      * 11/1994
JP          4-313601       11/1992

(Continued)

OTHER PUBLICATIONS

International Search Report issued on Aug. 28, 2013 for PCT/JP2012/064233 filed on May 31, 2012 with English Translation.

*Primary Examiner* — Steven Sutherland
(74) *Attorney, Agent, or Firm* — Oblon, McClelland, Maier & Neustadt, L.L.P.

(57) ABSTRACT

A heat recovery steam generator has a plurality of heat exchangers, including superheaters 28, 30, an evaporator 32 and an economizer 34, disposed in a duct 27 along the flow direction of an exhaust gas 25 from a gas turbine 14, and generates steam by utilizing the exhaust gas 25 from the gas turbine 14. The heat recovery steam generator includes: auxiliary combustors 50, 52, each disposed upstream of one of the heat exchangers, for heating the exhaust gas by means of burners; and an air supply device for supplying air to the burners of the auxiliary combustor 52 from the outside of the duct.

17 Claims, 5 Drawing Sheets

(52) U.S. Cl.
CPC ............... *F01K23/106* (2013.01); *F23C 5/08* (2013.01); *F23N 5/00* (2013.01); *Y02E 20/14* (2013.01); *Y02E 20/16* (2013.01)

(56) References Cited

U.S. PATENT DOCUMENTS

| | | | | |
|---|---|---|---|---|
| 5,558,047 | A | * | 9/1996 | Vetterick ............... F22B 1/1815 122/235.11 |
| 5,628,183 | A | * | 5/1997 | Rice ....................... F01K 21/042 122/7 B |
| 5,632,143 | A | * | 5/1997 | Fisher ...................... F01K 23/10 60/39.181 |
| 6,141,956 | A | * | 11/2000 | Iijima ................... F22B 1/1815 122/7 R |
| 6,298,655 | B1 | * | 10/2001 | Lee ........................ F01D 25/30 60/39.182 |
| 6,557,499 | B2 | * | 5/2003 | Franke ................. F22B 21/346 122/1 B |
| 2010/0305768 | A1 | * | 12/2010 | Holt ........................ F01K 13/02 700/288 |

FOREIGN PATENT DOCUMENTS

| | | |
|---|---|---|
| JP | 7-29583 | 1/1995 |
| JP | 10-37716 | 2/1998 |
| JP | 2001-116208 | 4/2001 |
| JP | 2007-232262 | 9/2007 |

* cited by examiner

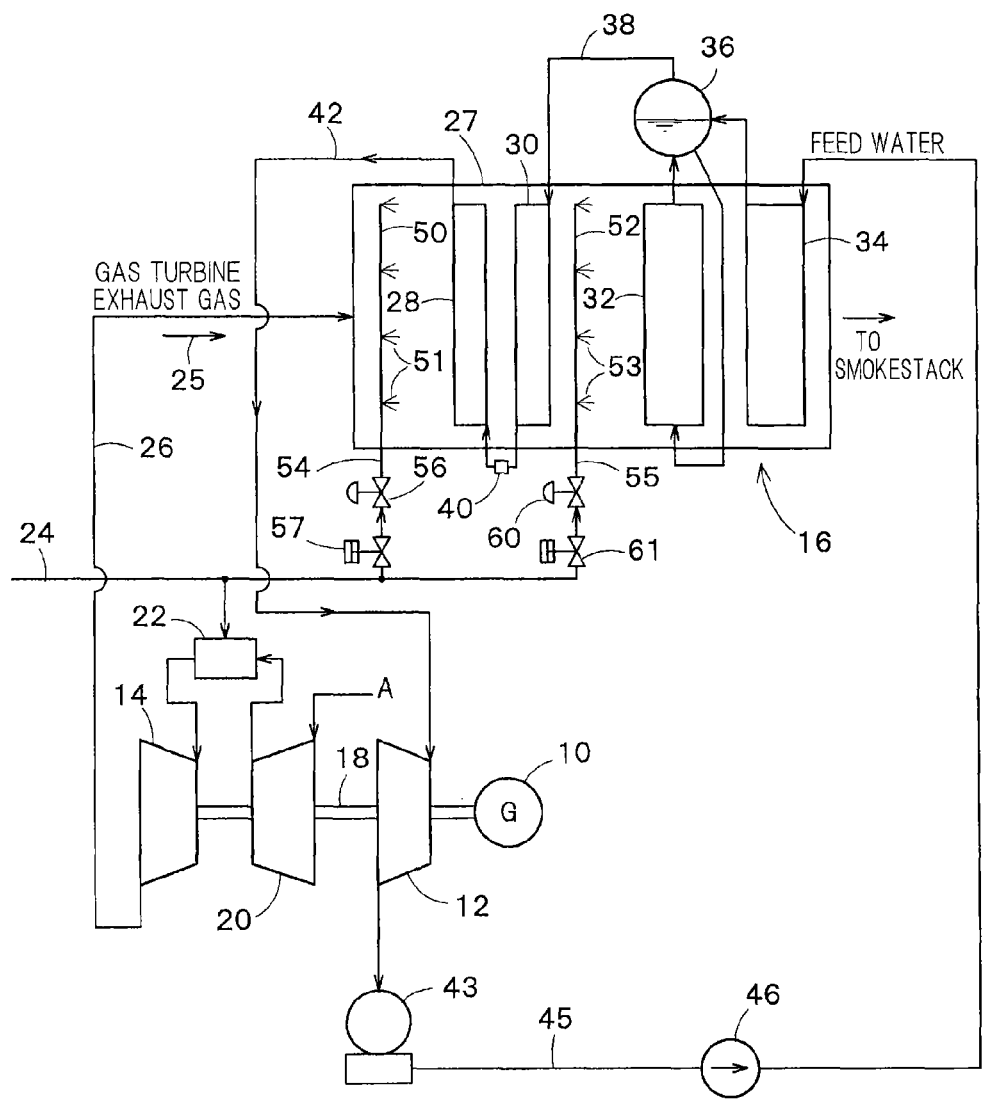
F I G. 1

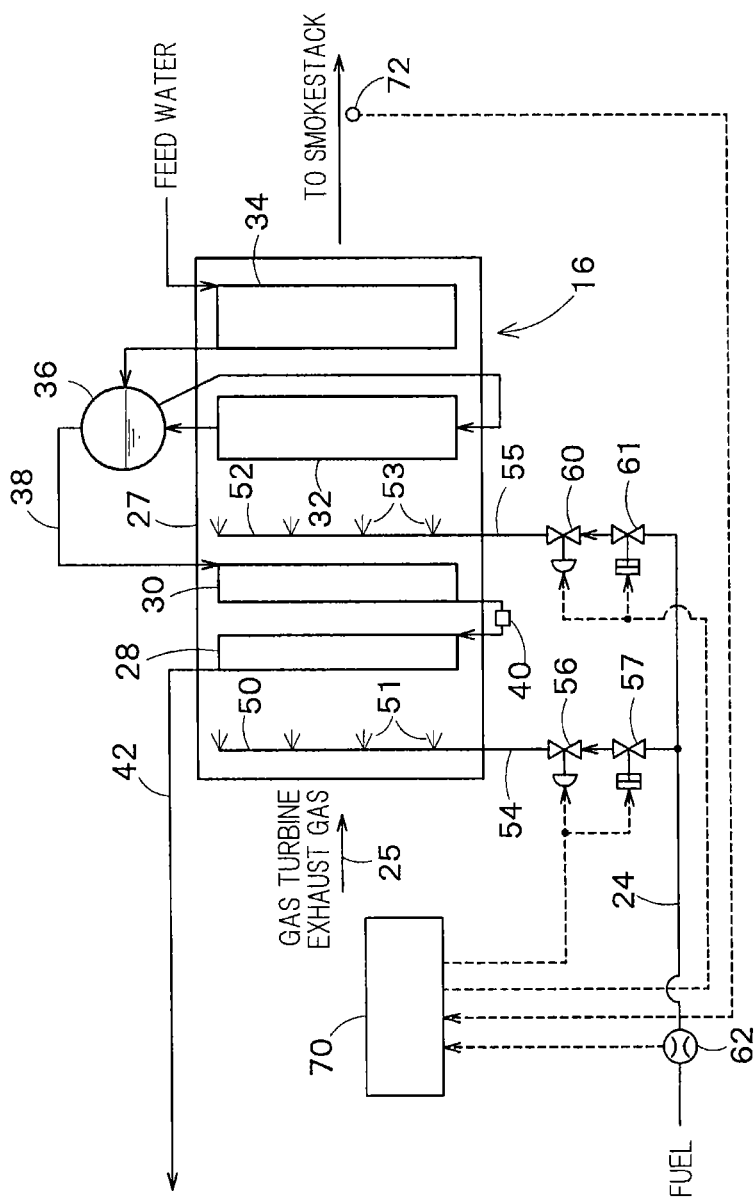
F I G. 2

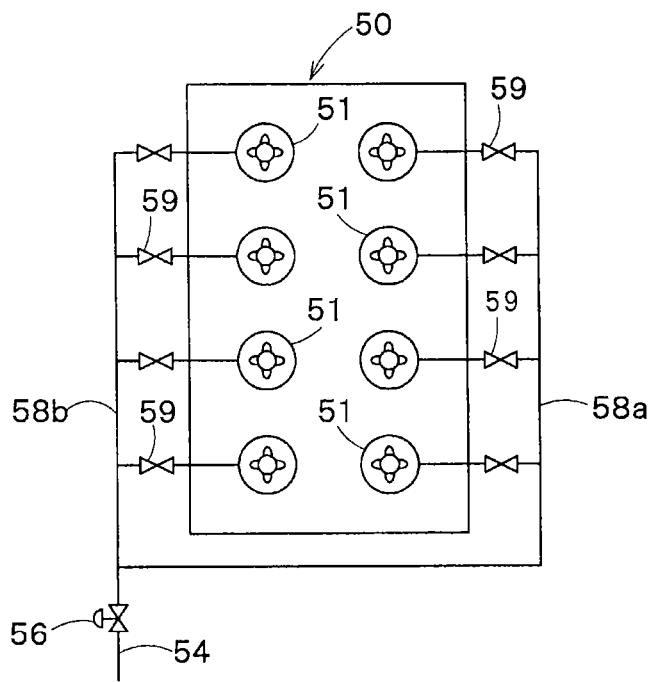
F I G. 3
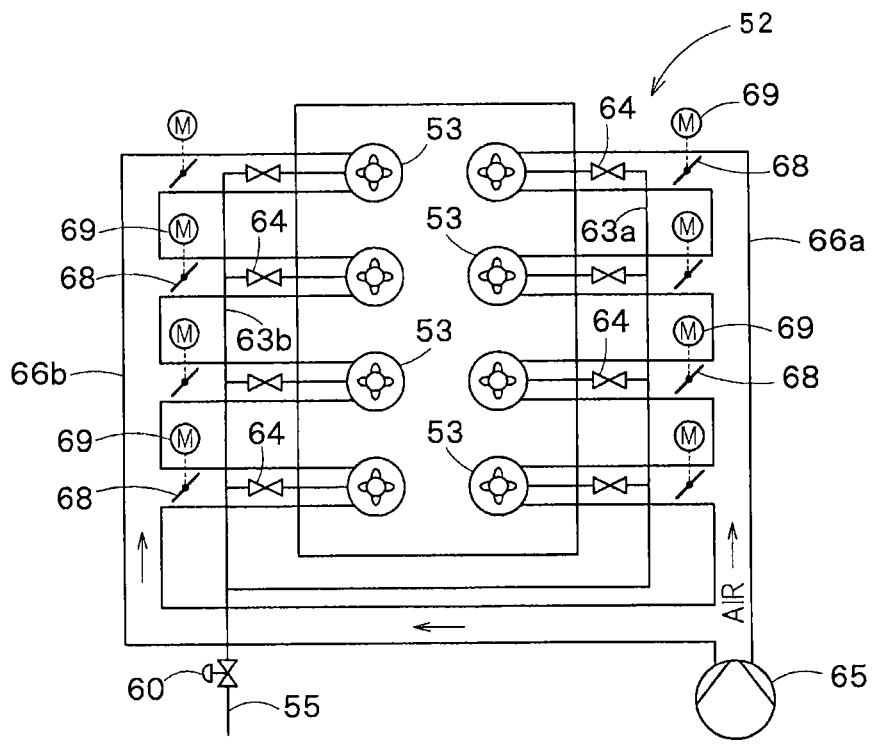
F I G. 4

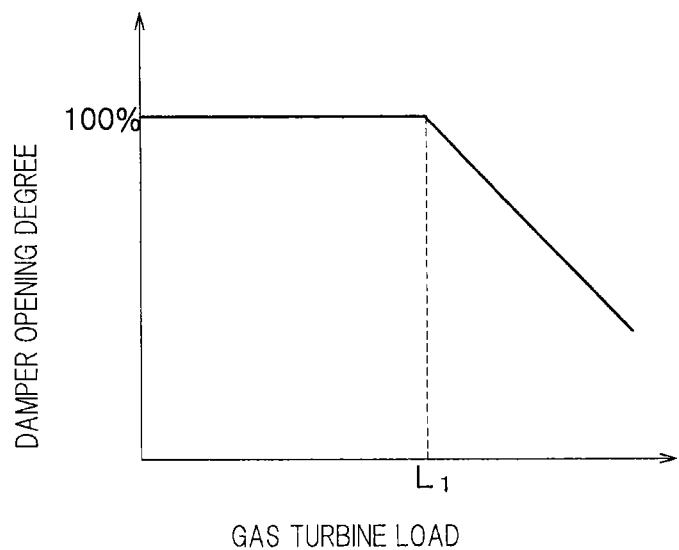
F I G. 5
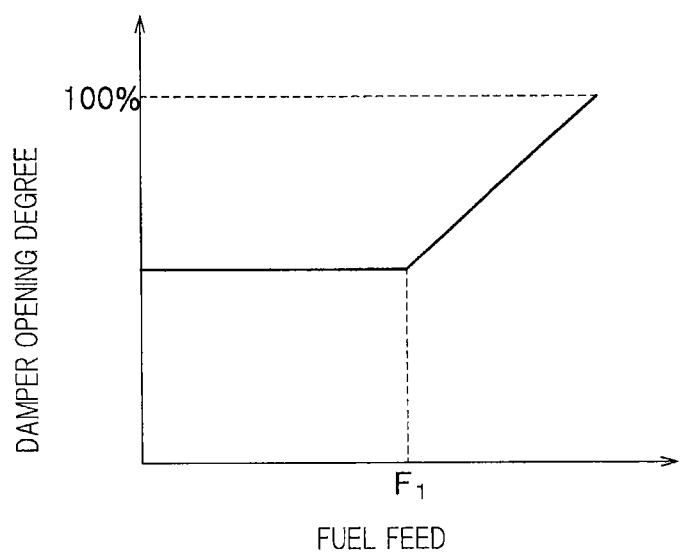
F I G. 6

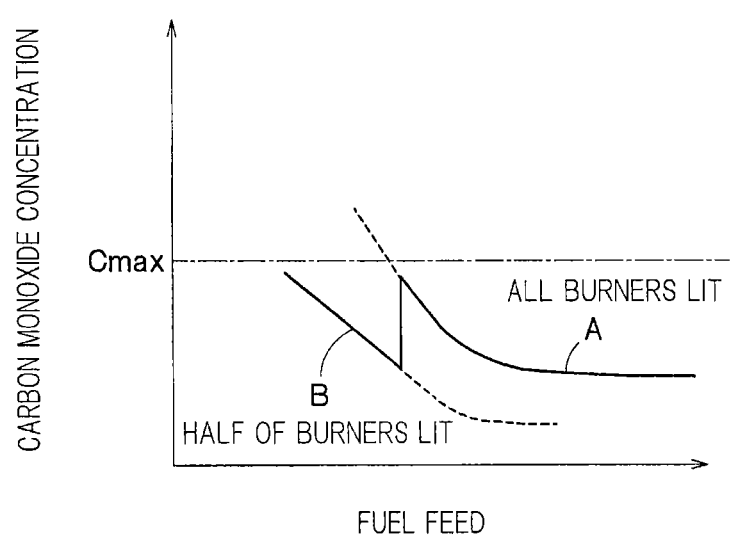
F I G. 7

HEAT RECOVERY STEAM GENERATOR AND POWER PLANT

CROSS-REFERENCE TO RELATED APPLICATION

This application is a Continuation Application of PCT Application No. PCT/JP2012/064233, filed May 31, 2012 and based upon and claiming the benefit of priority from Japanese Patent Application No. 2011-122420, filed on May 31, 2011, the entire contents of which are incorporated herein by reference.

TECHNICAL FIELD

Embodiments of the present invention relate to a heat recovery steam generator having an auxiliary combustor and to a power plant.

BACKGROUND ART

From the viewpoint of enhancing thermal efficiency, combined cycle power generation is becoming mainstream in recent thermal power plants. A combined cycle power plant is a power plant comprising a combination of a gas turbine, a steam turbine and a heat recovery steam generator. A high-temperature and high-pressure combustion gas is fed from a combustor to the gas turbine so that the combustion gas, through its expansion, rotates the gas turbine, thereby rotating a power generator. The exhaust gas is then introduced into the heat recovery steam generator, where steam is generated by the thermal energy of the exhaust gas. The steam is fed to the steam turbine which, together with the gas turbine, rotates the power generator.

A heat recovery steam generator is generally constructed to generate steam according to the amount of the heat of an exhaust gas from a gas turbine. These days an increasing number of heat recovery steam generators have an auxiliary combustor for heating an exhaust gas for the following reasons: Due to a lowering of the output of a gas turbine in the summer months, there is a decrease in the amount of an exhaust gas, resulting a decrease in the amount of steam generated in a heat recovery steam generator. The decrease in the amount of steam generated needs to be compensated for. In addition, increasing the amount of steam generated is necessary when steam generated is to be supplied to a site other than a steam turbine, such as a cogeneration plant or a water desalination plant.

The size of an auxiliary combustor, provided in such a recent heat recovery steam generator, is becoming larger these days in order to increase the amount of steam to be supplied. This leads to an increase in the temperature of an exhaust gas in a heat recovery steam generator, which may lower the durability and the reliability of boiler's constituent members. To avoid the problem, a proposal has been made which involves providing auxiliary combustors at a plurality of locations in a heat recovery steam generator (see e.g. Japanese Patent Laid-Open Publication No. 2001-116208).

DISCLOSURE OF THE INVENTION

A heat recovery steam generator having a plurality of auxiliary combustors has the following problems: When the auxiliary combustors are operated simultaneously, a large proportion of oxygen contained in an exhaust gas is consumed in a first-stage auxiliary combustor disposed most upstream in the flow direction of the exhaust gas, whereby the exhaust gas is likely to be deficient in the amount of oxygen in the other downstream auxiliary combustor(s). There is, therefore, a possibility of incomplete combustion and thus an increase in the concentrations of harmful substances, such as carbon monoxide, nitrogen oxide, etc. in the other auxiliary combustor(s).

Further, when the output of a gas turbine increases, the flow rate of an exhaust gas supplied to the heat recovery steam generator increases. The amount of fuel fed to an auxiliary combustor(s), having a plurality of burners, may therefore be reduced. The reduction in the fuel feed is likely to cause unstable combustion in each burner, resulting in an extremely high concentration of a harmful gas, such as carbon monoxide, in the exhaust gas.

It is therefore an object of the present invention to solve the above problems in the prior art and provide a heat recovery steam generator and a power plant which can maintain a good combustion state in the burners of an auxiliary combustor and can reduce the emission of a harmful gas, such as carbon monoxide, from the auxiliary combustor.

In order to achieve the object, the present invention provides a heat recovery steam generator which has a plurality of heat exchangers, including a superheater, an evaporator and an economizer, disposed in a duct along the flow direction of an exhaust gas from a gas turbine, and which generates steam by utilizing the exhaust gas from the gas turbine, said heat recovery steam generator comprising: auxiliary combustors, each disposed upstream of one of the heat exchangers, for heating the exhaust gas by means of burners; and an air supply device for additionally supplying air to the burners of at least one of the auxiliary combustors from the outside of the duct.

The present invention also provides a heat recovery steam generator which has a plurality of heat exchangers, including a superheater, an evaporator and an economizer, disposed in a duct along the flow direction of an exhaust gas from a gas turbine, and which generates steam by utilizing the exhaust gas from the gas turbine, comprising: auxiliary combustors, each disposed upstream of one of the heat exchangers, for heating the exhaust gas by means of burners; and means for extinguishing one or more of the burners of the auxiliary combustors so that the concentration of a harmful gas in the exhaust gas, emitted from the heat recovery steam generator, does not exceed a limit value.

The present invention also provides a power plant comprising: a gas turbine rotationally driven by a high-temperature, high-pressure combustion gas; a heat recovery steam generator which has a plurality of heat exchangers, including a superheater, an evaporator and an economizer, disposed in a duct along the flow direction of an exhaust gas from a gas turbine, and which generates steam by utilizing the exhaust gas from the gas turbine; a steam turbine driven by steam generated in the heat recovery steam generator; and a power generator driven by the gas turbine and the steam turbine, wherein said steam generator comprises: auxiliary combustors, each disposed upstream of one of the heat exchangers, for heating the exhaust gas by means of burners; and an air supply device for additionally supplying air to the burners of at least one of the auxiliary combustors from the outside of the duct.

BRIEF DESCRIPTION OF THE DRAWINGS

FIG. 1 is a system diagram of a power plant in which a heat recovery steam generator according to an embodiment of the present invention is applied;

FIG. 2 is a schematic view showing the construction of a heat recovery steam generator according to an embodiment of the present invention;

FIG. 3 is a schematic view showing the arrangement of burners in a first-stage auxiliary combustor provided in the heat recovery steam generator of FIG. 2;

FIG. 4 is a schematic view showing the arrangement of burners in a second-stage auxiliary combustor provided in the heat recovery steam generator of FIG. 2;

FIG. 5 is a graph showing the relationship between the load of a gas turbine and the degree of opening of an air control valve in the auxiliary combustor of FIG. 4;

FIG. 6 is a graph showing the relationship between the amount of fuel fed and the degree of opening of the air control valve in the auxiliary combustor of FIG. 4; and FIG. 7 is a graph showing the relationship between the amount of fuel fed and the concentration of carbon monoxide in the auxiliary combustor of FIG. 4.

BEST MODE FOR CARRYING OUT THE INVENTION

A preferred embodiment of a heat recovery steam generator according to the present invention will now be described with reference to the accompanying drawings.

FIG. 1 is a system diagram of a combined cycle power plant in which the heat recovery steam generator of the present invention is applied.

In FIG. 1, reference numeral 10 represents a power generator, 12 represents a steam turbine, and 14 represents a gas turbine. Reference numeral 16 represents a heat recovery steam generator.

The power generator 10 is coupled to the steam turbine 12 and the gas turbine 14 by the same drive shaft 18. Further, an air compressor 20 is coupled to the drive shaft 18. The air compressor 20 compresses air A, which has been taken in from the outside, into a high-temperature and high-pressure state and supplies the compressed air to a combustor 22. In the combustor 22, a fuel that has been supplied from a fuel system 24 is mixed with compressed air and burns, and the high-temperature, high-pressure combustion gas is fed to the gas turbine 14. Expansion work performed by the combustion gas rotationally drives the gas turbine 14, thereby rotating the power generator 10. An exhaust gas 25, discharged from the gas turbine 14, is passed through an exhaust duct 26 and introduced into the heat recovery steam generator 16.

As shown in FIG. 1, in the duct 27 of the heat recovery steam generator 16 are provided four types of heat exchangers, a high-temperature superheater 28, a low-temperature superheater 30, an evaporator 32 and an economizer 34, which are disposed in this order in the flow direction of the exhaust gas 25 discharged from the gas turbine 14, with the superheater 28 being located most upstream. The evaporator 32 is provided with a steam drum 36. The economizer 34 heats boiler feed water with the heat of the exhaust gas 25, and supplies the heated water to the steam drum 36. In the steam drum 36, saturated steam generated in the evaporator 32 is subjected to gas-liquid separation, and the surface of water is kept at a predetermined level in order to balance with the saturated steam. Water which has undergone the gas-liquid separation in the steam drum 36 is re-introduced into the evaporator 32.

Saturated steam in the steam drum 36 is fed through a saturated steam pipe 38 into the low-temperature superheater 30, where the steam is superheated. The heated steam is then introduced into the high-temperature superheater 28, where the steam is further superheated. A temperature reducer 40 for adjusting the temperature of steam is provided between the low-temperature superheater 30 and the high-temperature superheater 28.

An outlet pipe 42 is connected to the boiler outlet of the high-temperature superheater 28. The superheated steam that has been superheated in the high-temperature superheater 28 is fed though the outlet pipe 42 to the steam turbine 12, where the heated steam performs expansion work and rotates the steam turbine 12. The steam after the work is introduced into a steam condenser 43, where the steam is returned to water. The condensed water is then fed through a condensate return pipe 45 into a water feed pump 46 whereby the water is pressured and returned to the economizer 34. First and second fuel supply pipes 54 and 55 for supplying a fuel to auxiliary combustors 50 and 52, respectively, branch off from the fuel system 24.

In the heat recovery steam generator 16 of this embodiment, the auxiliary combustors 50, 52 are provided as follows:

The first-stage auxiliary combustor 50 is disposed most upstream in the flow direction of the exhaust gas 25 and, in the case of the heat recovery steam generator 16 of this embodiment, is disposed upstream of the high-temperature superheater 28. The first-stage auxiliary combustor 50 has a plurality of burners 51 directed toward the downstream high-temperature superheater 28. The first fuel supply pipe 54 is provided with a fuel control valve 56 and a fuel shutoff valve 57. The amount of fuel, to be fed into the burners 51, is controlled by adjusting the degree of opening of the fuel control valve 56. The fuel shutoff valve 57 is closed when extinguishing all the burners 51.

FIG. 3 is a diagram showing the arrangement of the burners 51 in the first-stage auxiliary combustor 50 and also showing fuel supply pipes to the respective burners 51. The first fuel supply pipe 54 branches out into fuel supply pipes 58a, 58b downstream of the fuel control valve 56 and, in this embodiment, the fuel supply pipes 58a, 58b are each connected to four burners 51 in parallel via fuel shutoff valves 59. Each burner 51 can be extinguished individually by closing the corresponding fuel shutoff valve 59.

Referring now to FIG. 2, the second-stage auxiliary combustor 52 is disposed downstream of the first-stage auxiliary combustor 50 and, in this embodiment, upstream of the evaporator 32. The second-stage auxiliary combustor 52 has a plurality of burners 53 directed toward the downstream evaporator 32. The second fuel supply pipe 55 is provided with a fuel control valve 60 for controlling the amount of fuel to be fed to the burners 53, and a fuel shutoff valve 61 which is closed when extinguishing all the burners 53.

FIG. 4 is a diagram showing the arrangement of the burners 53 in the second-stage auxiliary combustor 52 and also showing fuel supply pipes and air ducts to the respective burners 53. As with the first-stage auxiliary combustor 50, the second fuel supply pipe 55 branches out into fuel supply pipes 63a, 63b downstream of the fuel control valve 60 and, in this embodiment, the fuel supply pipes 63a, 63b are each connected to four burners 53 in parallel via fuel shutoff valves 64. Each burner 53 can be extinguished individually by closing the corresponding shutoff valve 64.

Air from a fan 65 flows in air ducts 66a, 66b and is introduced into the burners 53. An air control valve 68 is provided at an air inlet in each burner 53. The degree of opening of the air control valve 68 can be adjusted by means of an actuator 69.

In FIG. 2, reference numeral 70 represents a controller for controlling operations to light/extinguish the first-stage auxiliary combustor 50 and the second-stage auxiliary combustor 52 and also controlling the amount of air to be supplied to the auxiliary combustors 50, 52. The flow rate of fuel flowing in the fuel system 24 is detected by a flow meter 62 and inputted into the controller 70. A gas sensor 72 for detecting the concentration of a harmful gas, such as carbon monoxide or nitrogen oxide, in the exhaust gas is provided in an exhaust duct for introducing the exhaust gas, discharged from the heat recovery steam generator 16, into a smokestack. A gas concentration detection signal from the gas sensor 72 is introduced into the controller 70.

The operation of the heat recovery steam generator of this embodiment, having the above-described description, will now be described.

The operations of the first-stage auxiliary combustor 50 and the second-stage auxiliary combustor 52 in the heat recovery steam generator 16 will be described first.

As shown in FIG. 1, the second-stage auxiliary combustor 52 is disposed upstream of the evaporator 32. By heating the exhaust gas 25 with a flame emitted from each burner 53, the amount of evaporation in the evaporator 32 can be increased.

On the other hand, the first-stage auxiliary combustor 50 is disposed upstream of the high-temperature superheater 28 and the low-temperature superheater 30. By heating the exhaust gas 25 with a flame emitted from each burner 51, the degree of superheat of steam in each of the high-temperature superheater 28 and the low-temperature superheater 30 can be increased.

If the amount of steam to be supplied to the steam turbine 12 becomes insufficient during the operation of the heat recovery steam generator 16, performed without lighting the auxiliary combustors 50, 52, and needs to be increased, the burners 53 of the second-stage auxiliary combustor 52 are lit first and the amount of fuel fed to the second-stage auxiliary combustor 52 is increased. If the first-stage auxiliary combustor 50 is operated from the start, the high-temperature superheater 28 and the low-temperature superheater 30, which are insufficient in the amount of evaporation, may be too superheated by the high-temperature exhaust gas 25.

While feeding fuel only into the second-stage auxiliary combustor 52 and burning the fuel in the burners 53, a sufficient amount of oxygen exists in the exhaust gas 25, and therefore the fuel keeps burning in a stable combustion state.

When it is intended to further increase the amount of steam to be supplied to the steam turbine 12, the fuel is supplied also to the first-stage auxiliary combustor 50 to burn the fuel in the burners 51. Unless the temperature of the exhaust gas 25 is raised by heating it by means of the first-stage auxiliary combustor 50, superheating of steam in the high-temperature superheater 28 and the low-temperature superheater 30 can be insufficient, resulting in a too low steam temperature at the boiler outlet of the high-temperature superheater 28.

When continuing to burn the fuel in both of the first-stage auxiliary combustor 50 and the second-stage auxiliary combustor 52, a stable combustion state will be maintained in the first-stage auxiliary combustor 50 because of sufficient supply of oxygen by the exhaust gas 25. On the other hand, the exhaust gas 25, whose oxygen content has decreased due to its consumption in the first-stage auxiliary combustor 50, is supplied to the second-stage auxiliary combustor 52. Therefore, the exhaust gas 25 in the second-stage auxiliary combustor 52 is likely to be deficient in oxygen, leading to an unstable combustion state.

In view of this, in this embodiment the fan 65 is rotated to cause air to flow through the air ducts 66a, 66b and to be supplied to the burners 53, as shown in FIG. 4, so that unstable combustion due to a shortage of oxygen will not occur in the second-stage auxiliary combustor 52. Oxygen can thus be additionally supplied to the burners 53 of the second-stage auxiliary combustor 52. This makes it possible to ensure a stable combustion state in the second-stage auxiliary combustor 52, thereby preventing emission of a harmful gas, such as carbon monoxide, from the second-stage auxiliary combustor 52.

The combustion state in the second-stage auxiliary combustor 52 will not be stable if the amount of air supplied by the fan 65 is too large or too small. An appropriate amount of air is therefore supplied to each burner 53 while adjusting the degree of opening of each air control valve 68. When adjusting the degree of opening of an air control valve 68, the controller 70 instructs the corresponding actuator 69 on the intended degree of opening of the air valve 68. The controller 70 automatically controls the degree of opening of each air control valve 68 to maintain the optimal combustion state while monitoring the concentration of a harmful gas, such as carbon monoxide, emitted from the second-stage auxiliary combustor 52 based on an output signal from the gas sensor 72.

When additionally supplying air to the second-stage auxiliary combustor 52 by means of the fan 65, the load of the gas turbine 14 and the amount of the fuel fed, in addition to the amount of air supplied, affect the combustion state in the auxiliary combustor 52. In particular, the combustion state in the second-stage auxiliary combustor 52 will be considerably unstable and an increased amount of carbon monoxide, etc. will be emitted when the gas turbine 14 is operated at high load and a small amount of fuel is fed into the second-stage auxiliary combustor 52.

FIG. 5 is a graph showing the relationship between the load of the gas turbine 14 and the degree of opening of the air control valve 68.

The flow rate of the exhaust gas 25, supplied from the gas turbine 14 to the heat recovery steam generator 16, is low when the gas turbine 14 is operated in a low-load range, and therefore the degree of opening of the air control valve 68 is set to be full open as shown in FIG. 5. The flow rate of the exhaust gas 25 increases with increase in the load of the gas turbine 14. After a preset load L1 is reached, the controller 70 gradually decreases the degree of opening of the air control valve 68 so that air will not be supplied in an excessive amount to each burner 53 of the second-stage auxiliary combustor 52. With reference to the degree of opening of the air control valve 68, the optimal opening degree in relation to the load of the gas turbine 14 is preset so that the concentration of a harmful gas, such as carbon monoxide, in the gas emitted from the second-stage auxiliary combustor 52 will not exceed a limit value; the opening degree may be decreased linearly as shown in FIG. 5.

The degree of opening of the air control valve 68 is thus decreased with increase in the load of the gas turbine 14. This makes it possible to supply an optimal amount of air to each burner 53 of the second-stage auxiliary combustor 52, thereby maintaining a stable combustion state.

FIG. 6 is a graph showing the relationship between the amount of fuel fed to the second-stage auxiliary combustor 52 and the degree of opening of the air control valve 68.

If the degree of opening of the air control valve 68 is high when the amount of fuel fed to the second-stage auxiliary combustor 52 is small, an excessive amount of air will be supplied to each burner 53. Therefore, as shown in FIG. 6, an appropriate degree of opening of the air control valve 68 is preset in a low-fuel feed range in order to stabilize combustion in each burner 53. The amount of air necessary for combustion increases with increase in the amount of fuel fed to the second-stage auxiliary combustor 52. Accordingly, in order for the concentration of a harmful gas, such as carbon monoxide, in the exhaust gas not to exceed a limit value, the controller 70, while monitoring the fuel feed with the flow meter 62, increases the amount of air supplied to each burner 53 by increasing the degree of opening of the air control valve 68 after a preset fuel feed F1 is reached.

It is possible to use the pattern of change in the valve opening degree shown in FIG. 5 and the pattern of change in the valve opening degree shown in FIG. 6 in combination, and to automatically adjust the degree of opening of the air control valve 68 while simultaneously monitoring the load of the gas turbine 14 and the amount of fuel fed to the second-stage auxiliary combustor 52.

While the present invention has been described with reference to the case of stabilizing the combustion state in the second-stage auxiliary combustor 52 while feeding air to all the burners 53, it is also possible to extinguish one or more of the eight burners 53 provided in the second-stage auxiliary combustor 52, as follows:

For example, when the output of the gas turbine 14 is high, a large amount of exhaust gas is supplied into the heat recovery steam generator 16. Thus, provided that the same amount of fuel is fed to the second-stage auxiliary combustor 52, the amount of steam generated increases with increase in the output of the gas turbine 14.

Therefore, when the output of the gas turbine 14 is increased, the amount of fuel fed to the second-stage auxiliary combustor 52 may need to be decreased so that the amount of steam generated will not exceed an upper limit value.

When the amount of fuel fed to the second-stage auxiliary combustor 52 is decreased, the combustion state in each burner 53 is likely to become unstable and, in some cases, the concentration of a harmful gas, such as carbon monoxide, can become extremely high. In such a case, some of the burners 53 are extinguished so that the concentration of a harmful gas, such as carbon monoxide, will not exceed a predetermined limit value, as show in FIG. 7.

In FIG. 7, the abscissa represents the amount of fuel fed to the second-stage auxiliary combustor 52 and the ordinate represents the concentration of carbon monoxide in a gas emitted from the second-stage auxiliary combustor 52. The "Cmax" represents the limit value for the concentration of carbon monoxide.

The curve A shows change in the concentration of carbon monoxide when all the burners 53 of the second-stage auxiliary combustor 52 are lit. The concentration of carbon monoxide increases with decrease in the fuel feed. The controller 70, based on an output signal from the gas sensor 72, monitors the concentration of carbon monoxide emitted from the second-stage auxiliary combustor 52 and, when the concentration of carbon monoxide has come close to the limit value Cmax, closes the fuel shutoff valves 64 of e.g. half, i.e. four in the illustrated case, of the burners 53 to extinguish the burners.

Consequently, the amount of fuel fed to each of the remaining four lighting burners increases. Accordingly, the amount of oxygen which, together with the fuel, is supplied to each of the lighting burners also increases, whereby the combustion state becomes stable. This can significantly reduce the concentration of carbon monoxide as shown by the curve B.

When extinguishing a plurality of burners 53, it is preferred to simultaneous extinguish burners 53 lying in the same horizontal plane, such as those shown in FIG. 4. This can reduce non-uniformity of the temperature of the exhaust gas 25, heated by the burners 53, in a horizontal direction.

As described above, some of the burners 53 of the second-stage auxiliary combustor 52 may be extinguished to stabilize the combustion state in the remaining lighting burners 53. Also in the first-stage auxiliary combustor 50 shown in FIG. 3, it is possible to extinguish some of the eight burners 51 by closing the corresponding fuel shutoff valves 59 when reducing the amount of fuel fed to the first-stage auxiliary combustor 50.

While the heat recovery steam generator of the present invention has been described with reference to a preferred embodiment thereof, having the first-stage auxiliary combustor and the second-stage auxiliary combustor, it is understood that the embodiment is merely illustrative and does not limit the scope of the present invention.

The heat recovery steam generator of the present invention can also be applied in a plant which supplies steam not only to a steam turbine but also to e.g. a water desalination plant.

The invention claimed is:

1. A heat recovery steam generator, comprising:
   a duct, in which an exhaust gas from a gas turbine is configured to flow;
   a superheater, an evaporator, and an economizer disposed in the duct along a flow direction of the exhaust gas;
   a first auxiliary combustor comprising a plurality of first burners, disposed upstream of the superheater;
   a second auxiliary combustor, comprising a plurality of second burners, disposed upstream of the evaporator;
   an air supply configured to supply air from an outside of the duct to the plurality of second burners, the air supply comprising a regulator configured to regulate an amount of the air to be supplied;
   a detector configured to detect a concentration of a harmful gas in the exhaust gas exhausted from the duct; and
   a controller configured to control the regulator based on the concentration detected with the detector.

2. The heat recovery steam generator according to claim 1, wherein the air supply includes an air duct configured to supply the air to the plurality of second burners, and a fan configured to flow the air in the air duct.

3. The heat recovery steam generator according to claim 1, wherein the controller is configured to control the regulator based on a load of the gas turbine.

4. The heat recovery steam generator according to claim 3, wherein the controller is configured to control the regulator to regulate the amount of the air to be decreased with an increase of the load.

5. The heat recovery steam generator according to claim 4, wherein the controller is configured to control the regulator to regulate the amount of the air to be kept maximum when the gas turbine is operated at a load lower that a preset load value.

6. The heat recovery steam generator according to claim 1, wherein the controller is configured to control the regulator based on an amount of fuel fed to the plurality of second burners.

7. The heat recovery steam generator according to claim 6, wherein the controller is configured to control the regulator to regulate the amount of the air to be kept at a preset value when the amount of fuel fed to the plurality of second burners is smaller than a preset fuel feed value, and
   wherein the controller is configured to control the regulator to regulate the amount of the air to be increased with an increase in the fuel feed when the amount of fuel fed to the plurality of second burners is equal or higher than the preset fuel feed value.

8. The heat recovery steam generator according to claim 1, further comprising an extinguisher configured to extinguish one or more of the plurality of second burners.

9. A power plant comprising:
a gas turbine;
a heat recovery steam generator configured to generate steam by utilizing an exhaust gas from the gas turbine;
a steam turbine driven by steam generated in the heat recovery steam generator; and
a power generator driven by the gas turbine and the steam turbine;
wherein the heat recovery steam generator comprises:
  a duct, in which the exhaust gas is configured to flow;
  a superheater, an evaporator, and an economizer disposed in the duct along a flow direction of the exhaust gas;
  a first auxiliary combustor, comprising a plurality of first burners, disposed upstream of the superheater;
  a second auxiliary combustor, comprising a plurality of second burners, disposed upstream of the evaporator;
  an air supply configured to supply air from an outside of the duct to the plurality of second burners, the air supply comprising a regulator configured to regulate an amount of the air to be supplied;
  a detector configured to detect a concentration of a harmful gas in the exhaust gas exhausted from the duct; and
  a controller configured to control the regulator based on the concentration detected with the detector.

10. The power plant according to claim 9, wherein the air supply includes an air duct configured to supply the air to the plurality of second burners, and a fan configured to flow the air in the air duct.

11. The power plant according to claim 9, wherein the controller is configured to control the regulator based on a load of the gas turbine.

12. The power plant according to claim 11, wherein the controller is configured to control the regulator to regulate the amount of the air to be decreased with an increase of the load.

13. The power plant according to claim 12, wherein the controller is configured to control the regulator to regulate the amount of the air to be kept maximum when the gas turbine is operated at a load lower than a preset load value.

14. The power plant according to claim 9, wherein the controller is configured to control the regulator based on an amount of fuel fed to the plurality of second burners.

15. The power plant according to claim 14,
wherein the controller is configured to control the regulator to regulate the amount of the air to be kept at a preset value when the amount of fuel fed to the plurality of second burners is smaller than a preset fuel feed value, and
wherein the controller is configured to control the regulator to regulate the amount of the air to be increased with an increase in the fuel feed when the amount of the fuel fed to the plurality of second burners is equal or higher than the preset fuel feed value.

16. The power plant according to claim 9, wherein the heat recovery steam generator further comprises an extinguisher configured to extinguish one or more of the plurality of second burners.

17. A method for operating a power plant, the power plant including:
a gas turbine;
a heat recovery steam generator, configured to generate steam with an exhaust gas from the gas turbine, including:
  a duct, in which the exhaust gas is configured to flow;
  a superheater, an evaporator, and an economizer disposed in the duct along a flow direction of the exhaust gas;
  a first auxiliary combustor, comprising a plurality of first burners, disposed upstream of the superheater;
  a second auxiliary combustor, comprising a plurality of second burners, disposed upstream of the evaporator;
a steam turbine driven by steam generated in the heat recovery steam generator; and
a power generator driven by the gas turbine and the steam turbine;
the method comprising:
detecting a concentration of a harmful gas in the exhaust gas exhausted from the duct; and
controlling an amount of air from an outside of the duct to be supplied to the plurality of second burners based on the concentration detected.

* * * * *